United States Patent
Grau

(10) Patent No.: US 8,852,688 B2
(45) Date of Patent: Oct. 7, 2014

(54) METHOD FOR THE APPLICATION OF A LIQUID FILM AFTER AQUEOUS PRETREATMENT OF THE SURFACE TO BE COATED

(75) Inventor: Michael Grau, Hamburg (DE)

(73) Assignee: Mankiewicz Gebr. & Co., (GmbH & Co. KG), Hamburg (DE)

( * ) Notice: Subject to any disclaimer, the term of this patent is extended or adjusted under 35 U.S.C. 154(b) by 793 days.

(21) Appl. No.: 12/518,605

(22) PCT Filed: Oct. 1, 2007

(86) PCT No.: PCT/EP2007/008505
§ 371 (c)(1),
(2), (4) Date: Dec. 29, 2009

(87) PCT Pub. No.: WO2008/083733
PCT Pub. Date: Jul. 17, 2008

(65) Prior Publication Data
US 2010/0143594 A1 Jun. 10, 2010

(30) Foreign Application Priority Data
Dec. 20, 2006 (DE) .......................... 10 2006 060 398

(51) Int. Cl.
*B05D 3/00* (2006.01)
*B05D 5/00* (2006.01)
*C09D 5/20* (2006.01)
*B05D 1/32* (2006.01)
*B05D 3/10* (2006.01)

(52) U.S. Cl.
CPC . *C09D 5/20* (2013.01); *B05D 1/325* (2013.01); *B05D 5/00* (2013.01); *B05D 3/10* (2013.01)
USPC ........ 427/299; 427/421.1; 427/154; 427/156; 427/300; 427/303

(58) Field of Classification Search
USPC ....................... 427/154–156, 299–303, 421.1
See application file for complete search history.

(56) References Cited

U.S. PATENT DOCUMENTS 5,641,574 A * 6/1997 Kasari et al. ................... 428/413
5,965,195 A 10/1999 Muller et al.
(Continued)

FOREIGN PATENT DOCUMENTS

DE 196 52 728 6/1997 ............... B05D 7/04
DE 198 14 390 2/2000 ............... B29C 63/02
(Continued)

OTHER PUBLICATIONS

Dr. Ulrich Zorll et al., "Lacke und Druckfarben," Rompp Lexikon—5 pages.

(Continued)

*Primary Examiner* — Timothy Meeks
*Assistant Examiner* — Nathan T Leong
(74) *Attorney, Agent, or Firm* — Fitzpatrick, Cella, Harper & Scinto

(57) ABSTRACT

The invention concerns a method for producing removable surface protection by the application of a curable, liquid coating composition (liquid film), in which the surface is treated using water, or an aqueous solution of surface-active agents, and the coating composition is subsequently applied. Preferably, the surface is the topcoat of a motor vehicle. The invention further relates to the use of water or aqueous solutions of surface-active agents in such a method. Finally, the invention also relates to a removable surface protection coating of this nature. According to the invention, the flow of the coating composition into a uniform film is improved.

34 Claims, 3 Drawing Sheets

(56) References Cited

U.S. PATENT DOCUMENTS

Figure 1:
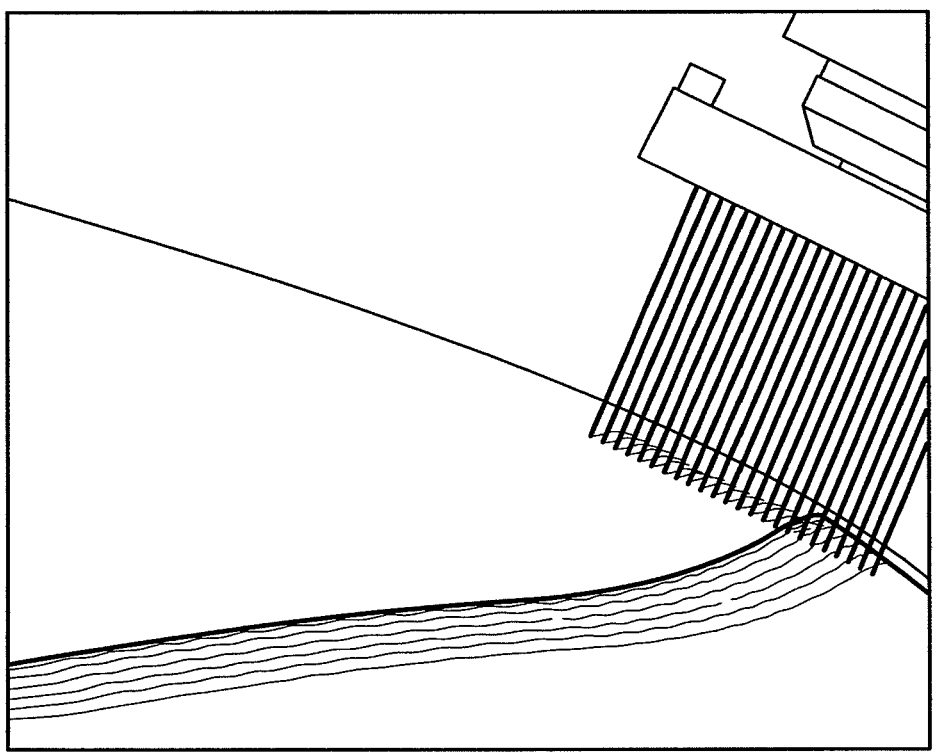

| | | | |
|---|---|---|---|
| 2002/0077377 A1 | 6/2002 | Zhang et al. | 521/82 |
| 2002/0160224 A1 | 10/2002 | Barger et al. | 428/689 |
| 2003/0163910 A1 | 9/2003 | Tojo et al. | 29/458 |
| 2004/0009354 A1 | 1/2004 | Krepski et al. | 428/423.1 |
| 2004/0028823 A1* | 2/2004 | Dutt | 427/385.5 |
| 2005/0189442 A1* | 9/2005 | Hussaini et al. | 239/556 |

FOREIGN PATENT DOCUMENTS

| | | | |
|---|---|---|---|
| DE | 198 54 760 | 5/2000 | B05B 13/04 |
| DE | 199 21 885 | 11/2000 | C08J 3/09 |
| DE | 103 11 420 | 9/2004 | C09D 5/02 |
| DE | 10 2004 018 5 | 12/2005 | B05B 1/14 |
| EP | 0 849 298 | 6/1998 | C08G 18/08 |
| JP | 61200497 A | 9/1986 | |
| JP | 61249572 A | 11/1986 | |
| JP | 10183060 A | 7/1998 | |
| JP | 11300268 A | 11/1999 | |
| WO | 2004/054727 | 7/2004 | B05D 3/10 |

OTHER PUBLICATIONS

"Notice of Opposition", dated Feb. 9, 2011, submitted to the European Patent Office in European Patent Application No. 07818585.7 (EP 2107949 B1). 5 sheets.

Translation of Japanese Office Action issued on Mar. 16, 2012 in corresponding Japanese Patent Application No. 2009-541787.

* cited by examiner

METHOD FOR THE APPLICATION OF A LIQUID FILM AFTER AQUEOUS PRETREATMENT OF THE SURFACE TO BE COATED

The invention concerns a method for producing removable surface protection by the application of a curable, liquid coating composition (also referred to as a liquid film), in which the surface to be protected is treated using water, or an aqueous solution of surface-active agents, and the coating composition is subsequently applied. The invention further relates to the use of water or aqueous solutions of surface-active agents in such a method. Finally, the invention also relates to a removable surface protection coating of this nature.

Customarily, motor vehicles are provided with surface protection after their manufacture, to protect the finish paint from damage such as scratches. This surface protection is removed before transfer of the vehicle to the purchaser. For example, wax coatings are known which must be removed with solvents, and which have proven disadvantageous for this reason. In addition, the adhesion of films has been proposed, although their application is associated with a disproportionately great expenditure of time. Moreover, damage to the surface can occur during their adhesion, although of course the intent is to avoid such damage. In view of this state of affairs, DE 196 52 728 A1 describes a liquid that hardens to a film, with the film being removed prior to delivery to the customer.

DE 198 54 760 A1 describes such a method for producing removable surface protection on a painted motor vehicle body. In this method, a liquid is sprayed on the painted body surface. This liquid hardens to a strippable film, which is why such a liquid coating composition is also called a liquid film. According to DE 198 54 760 A1, the film is applied by means of two fan nozzles of differing width in order to avoid unintentional spraying of surfaces areas that are not meant to be coated (overspray) and to achieve sharp-contoured application. Disadvantages of the method described in DE 198 54 760 A1 include:

The uneven film thickness of the applied coating composition. The film thickness is greater at the edges of the applied band than in the middle of the band.

The width of the band applied with a fan nozzle fluctuates as a function of the pressure under which the composition is discharged from the nozzle. In order to cover relatively large areas with a continuous film composed of individual bands, the bands discharged from the fan nozzle must be applied in an overlapping manner. As a result, the coating thickness of the applied film is additionally increased in the regions of band overlap.

Uneven coating thickness of the applied film leads to uneven drying behavior. In order to obtain a film that is completely dried through at all points, it is necessary to orient the drying conditions to the greatest possible film thickness that occurs. This requires higher drying temperatures and/or longer drying times.

DE 10 2004 018,597 A1 describes an application head with multiple sequentially arranged rows of adjacent round jet nozzles (multi-jet nozzle) for the application of a liquid film along a band direction. The use of a multi-jet nozzle in liquid film application has a variety of advantages:

A plurality of liquid film beads are simultaneously discharged adjacent to one another. These beads merge into one another immediately after application and form a band of liquid film. The film thickness of the beads applied at the edge of a band is equal to that of the beads applied in the center, which is to say that the film thickness of the band thus applied is more uniform across the width of the band than when a fan nozzle is used.

When a multi-jet nozzle is used, the width of the applied band does not depend as strongly on the material pressure as when a fan nozzle is used. For this reason, it is not necessary to apply the individual bands in an overlapping manner in order to coat relatively large areas with a continuous film. As a result, the coating thickness distribution is more uniform than when a fan nozzle is used.

However, the use of a multi-jet nozzle is also associated with disadvantages:

In order to create a uniform, continuous band, the individual beads applied adjacent to one another must merge into one another. This is why the individual beads must have a relatively great coating thickness. Consequently, material consumption is higher than when a fan nozzle is used.

In order to produce a sufficiently great coating thickness in the individual material beads, a relatively high material pressure is again necessary. This has the result that the material is discharged at a comparatively high speed from the multi-jet nozzle, and produces backspray after striking the surface to be coated. The airborne droplets of material contaminate the vehicle surface outside of the region that is meant to be coated. These contaminants have to be removed by hand after drying/curing of the liquid film, which is costly.

The object of the present invention was to provide a method with which it is possible to exploit the advantages associated with the use of a multi-jet nozzle. At the same time, the intent was to avoid the disadvantages associated with such use of a multi-jet nozzle, in particular the increased material consumption associated therewith and the overspray. Lastly, there is always a need for a method with lower material consumption and a correspondingly thinner removable surface protection coating.

Surprisingly, it has now been found that these objects can be attained and further problems of the prior art can be avoided by treating the surface to be coated with water or an aqueous solution of one or more surface-active agents and subsequently applying the coating composition. When one treats the surface, for example a painted motor vehicle body, with water or aqueous solutions of surface-active agents and applies the liquid film to the pretreated surfaces, one obtains a continuous, flowed band, and a corresponding film, even for a thinner coating thickness, than when the liquid film is applied to dry surfaces. As a result, material consumption per unit area is reduced with a continuous film nevertheless being produced. Moreover, the material pressure can be reduced enough that backspray of the coating material can be avoided.

A significant advantage of the inventive application method with prewetting as compared to the noninventive application methods without prewetting is the saving in material of 15% to 20% per unit area that is achieved with the inventive method.

To be sure, the washing with water or aqueous cleaning agents of surfaces to be coated as pretreatment prior to coating is known. In this process, contaminants are removed which could impair adhesion of the coating to the surface. However, the water or aqueous cleaning agent is completely removed from the surface before application of the coating material is begun.

Accordingly, the invention concerns a method for producing removable surface protection in which (a) the surface is treated using water, or an aqueous solution of one or more surface-active agents, (b) a (liquid, curable) coating composition is applied to the treated surface before the water has dried completely from the treated surface, and (c) the coating composition is cured in order to obtain a hardened coating with a film thickness of at most 200 µm.

In a preferred embodiment, in step (a), the surface is treated with water, which if desired may be condensed onto the surface through condensation from air that is supersaturated with water. The pretreatment through condensation has the advantage that the resultant water film thicknesses are uniform and thin. Moreover, application technology for spraying with water can be eliminated. In another preferred embodiment, the treatment of the surface with water or the aqueous solution of surface-active agents may be accomplished by spraying.

In another preferred embodiment, the temperature of the surface in step (a) is 1° C. to 50° C., preferably 5° C. to 40° C., more preferably 10° C. to 30° C., in particular 15° C. to 25° C.

It is preferred in all embodiments of the invention for the surface to be a surface of a motor vehicle finished with a topcoat. The coating structure on the motor vehicle surface is preferably a typical automotive body coating, which consists, for example, of a cathodic electrodip coating, optionally a filler, a base coat, and additionally a clear coat as the topcoat. However, it is also possible for a pigmented topcoat to be used instead of a base coat and transparent clear coat. The transparent or pigmented paint used as the final topcoat may be a paint based on, e.g., a single-component or two-component polyurethane system, or a melamine resin/polyol system. The polyols used for formulating the paint used as the topcoat may be polyester polyols, polyacrylate polyols, or polycarbonate polyols.

Preferably, the application of the coating composition takes place less than 25 minutes after step (a), more preferably 0.1 seconds to 25 minutes, in particular 0.1 seconds to 15 minutes, such as 0.1 second to 10 minutes, or 1 second to 1 minute, for example 1 second to 45 seconds, or 1 second to 30 seconds, after step (a).

The coating composition is preferably a water-thinnable coating that is, for example, polymer-dispersion based, in particular polyurethane-dispersion based, and especially preferred, polyester urethane-dispersion based.

The coating composition is applied, for example, by pouring, by placing beads of material, by hydraulic atomization (airless), by air-assisted hydraulic atomization (Airmix), or by pneumatic atomization. A variety of nozzle constructions may be used for this purpose, such as fan nozzles, slot nozzles, and round jet nozzles, for example.

To apply the coating composition, preferably a multi-jet nozzle with 1 to 6 rows of 5 to 500 nozzles per row, more preferably 10 to 320 nozzles, in particular 20 to 160 nozzles, such as 40 to 80 nozzles, is used.

In the inventive method, higher viscosity coating compositions can be used as compared to the method without prewetting. Preferred viscosity ranges are 5 to 40, preferably 10 to 35, in particular 15 to 30 Pa·s.

The film thickness of the cured coating composition is preferably 40 to 170 µm, more preferably 50 to 160 µm, in particular 60 to 130 µm, for example 70 to 120 µm, such as 80 to 110 µm or 90 to 100 µm.

The curing in step (c) can take place at elevated temperature, for example at 10° C. to 90° C., preferably 15° C. to 80° C., in particular 15° C. to 60° C., such as 20° C. to 50° C.

The invention additionally concerns a removable surface protection coating produced in accordance with the inventive method. Accordingly, this surface protection coating is characterized in that it is present in a comparatively thin film thickness of no more than 200 µm (in the cured state), which ensures adequate mechanical strength for stripping of the (cured) surface protection coating without an unnecessarily great quantity of coating composition having to be used, which would be disadvantageous because of the associated higher costs and longer curing/drying times.

In addition, the invention concerns the use of water or aqueous solutions of one or more surface-active agents in a method for producing a removable surface protection coating, in which the water or the aqueous solution of surface-active agents is applied to the surface and then a coating composition is applied to the treated surface before the surface has completely dried, in order to reduce the required quantity of coating composition as compared to a method without treatment using water or a solution of surface-active agents.

Finally, the invention also concerns the use of water or aqueous solutions of surface-active agents in a method for producing a removable surface protection coating, in which the water or the solution of surface-active agents is applied to the surface and then a coating composition is applied to the treated surface before the surface has completely dried, in order to avoid unwanted coating of certain areas of the surface with the coating composition (overspray).

Figure 2:
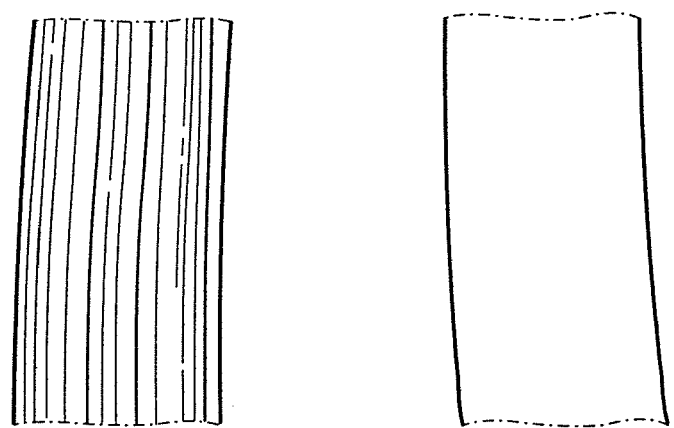

The advantages of the invention are also evident from FIGS. 1 and 2, in which

Figure 3:
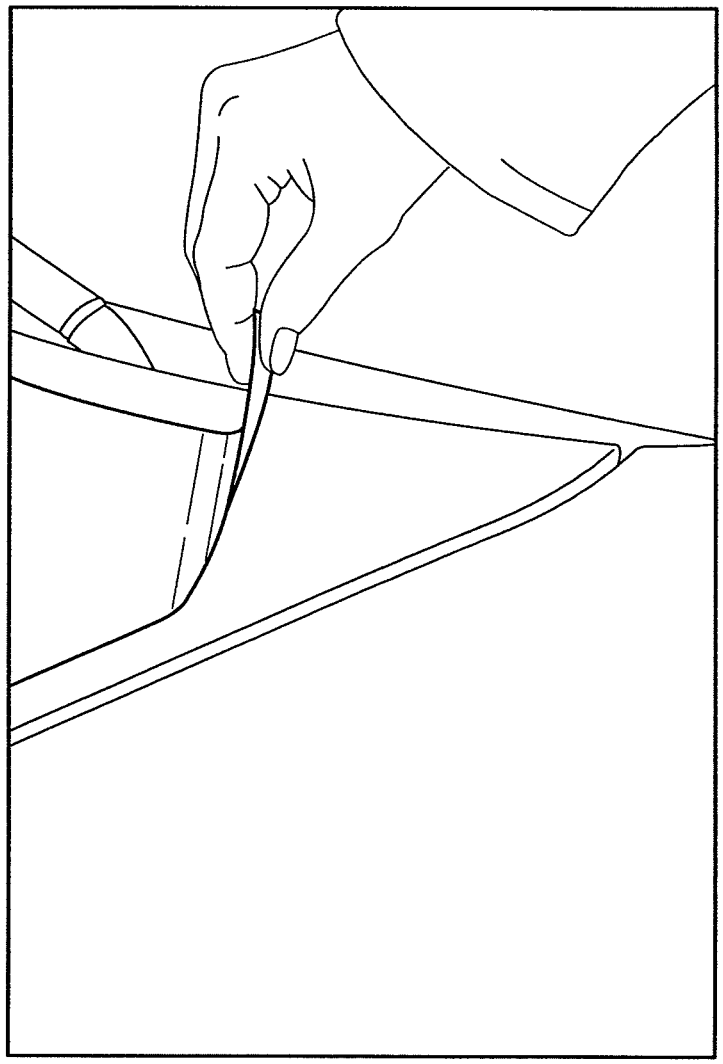

FIG. 1 shows the application of the coating composition in accordance with step (b), FIG. 2 shows two cured coatings, wherein a coating produced in accordance with the invention is shown on the right and a coating that was produced according to a method that does not include step (a) is shown on the left, and FIG. 3 shows the removal of a coating produced in accordance with the invention.

Illustrated in FIG. 1 is that the coating composition is delivered by means of a suitable metering device (pump) and discharged through a nozzle, which consists of a plurality of holes. The individual beads formed after emerging from the nozzle merge into a continuous film when they strike the surface. A certain positive pressure is necessary here, which makes it possible for the individual beads and bands to merge into a film.

FIG. 2 illustrates the advantages of the inventive method and accordingly produced coatings. One of the goals of the invention is to reduce the quantity of coating compound applied per unit area. The beads and bands of coating composition applied do not form a continuous film here (left side). It is only the prewetting that results in a film due to flow of the individual bands (right side). The surface to be protected is prewetted according to the invention, which results, during the subsequent application of the liquid film, in the uniform flow of said liquid film, specifically at lower application pressures, and hence also smaller quantities, of coating composition.

FIG. 3 illustrates the stripping of an inventively produced coating according to one embodiment of the invention, with the stage of stripping from an engine hood being shown. A water-thinnable, single-component, polyurethane-dispersion-based coating composition was applied for conservation of surfaces such as, e.g., automobile bodies. After drying (even at room temperature) is complete, the composition forms a protective coating (dried liquid film) that is highly mechanically and chemically resistant. This film can be removed by hand (stripped or pulled off), since it is only attached by relatively weak adhesion forces to the surface requiring protection. The dried composition is removed from the surface, customarily immediately prior to delivery of the automobile to the customer, simply by pulling it away from the surface, thus exposing the topcoat below it.

The invention claimed is:

1. A method for producing a removable protection coating on a surface comprising:
   (a) treating the surface using water or an aqueous solution of one or more surface-active agents,
   (b) applying a coating composition to the treated surface before the water has dried completely from the treated surface, and
   (c) curing the coating composition to obtain a removable, hardened protection coating having a film thickness of at most 200 µm, wherein the removable, hardened protection coating is capable of being pulled off the surface by hand.

2. The method according to claim 1, wherein the surface is treated only with water in step (a).

3. The method according to claim 2, wherein the water is condensed onto the surface.

4. The method according to claim 1, wherein the water or the aqueous solution of surface-active agents is sprayed onto the surface.

5. The method according to one of the preceding claims, wherein the temperature of the surface in step (a) is up to 50° C.

6. The method according to claim 5, wherein the temperature of the surface in step (a) is in a range from 1° C. to 50° C.

7. The method according to claim 5, wherein the temperature of the surface in step (a) is in a range from 5° C. to 40° C.

8. The method according to claim 5, wherein the temperature of the surface in step (a) is in a range from 10° C. to 30° C.

9. The method according to claim 5, wherein the temperature of the surface in step (a) is in a range from 15° C. to 25° C.

10. The method according to claim 1, wherein the surface is a surface of a motor vehicle comprising topcoat paint.

11. The method according to claim 10, wherein the topcoat is chosen from topcoats based on a single-component or two-component polyurethane system, or a melamine resin and polyol system.

12. The method according to claim 11, wherein the polyols include at least one of polyester polyols, polyacrylate polyols, and polycarbonate polyols.

13. The method according to claim 1, wherein step (b) takes place less than 25 minutes after step (a).

14. The method according to claim 13, wherein step (b) takes place between 0.1 seconds and 25 minutes after step (a).

15. The method according to claim 13, wherein step (b) takes place 0.1 seconds to 15 minutes after step (a).

16. The method according to claim 13, wherein step (b) takes place 0.1 second to 10 minutes after step (a).

17. The method according to claim 13, wherein step (b) takes place 1 second to 1 minute after step (a).

18. The method according to claim 13, wherein step (b) takes place 1 second to 45 seconds after step (a).

19. The method according to claim 13, wherein step (b) takes place 1 second to 30 seconds after step (a).

20. The method according to claim 1, wherein the coating composition is chosen from water-thinnable coating materials that are polymer-dispersion based.

21. The method according to claim 20, wherein the polymer-dispersion based materials include those materials that are polyurethane-dispersion based and polyester urethane dispersion-based.

22. The method according to claim 1, wherein the coating composition is applied from a multi jet nozzle with 1 to 6 rows of 5 to 500 nozzles per row.

23. The method according to claim 22, wherein the coating composition is applied from a multi jet nozzle with 1 to 6 rows of 10 to 320 nozzles.

24. The method according to claim 22, wherein the coating composition is applied from a multi jet nozzle with 1 to 6 rows of 20 to 160 nozzles.

25. The method according to claim 22, wherein the coating composition is applied from a multi jet nozzle with 1 to 6 rows of 40 to 80 nozzles.

26. The method according to claim 1, wherein the film thickness of the cured coating is 40 to 170 µm.

27. The method according to claim 26, wherein the film thickness of the cured coating is 50 to 160 µm.

28. The method according to claim 26, wherein the film thickness of the cured coating is 60 to 130 µm.

29. The method according to claim 26, wherein the film thickness of the cured coating is 70 to 120 µm.

30. The method according to claim 26, wherein the film thickness of the cured coating is 80 to 110 µm.

31. The method according to claim 26, wherein the film thickness of the cured coating is 90 to 100 µm.

32. The method according to claim 1, wherein the curing step (c) takes place at elevated temperature.

33. A method for producing a removable protection coating on a surface comprising:
   (a) treating the surface using an aqueous solution of one or more surface-active agents,
   (b) applying a coating composition to the treated surface before the aqueous solution of one or more surface-active agents has dried completely from the treated surface, and
   (c) curing the coating composition to obtain a removable, hardened coating having a film thickness of at most 200 µm, wherein the removable, hardened protection coating is capable of being pulled off the surface by hand.

34. The method according to claim 22, wherein the coating composition is applied from a multi-jet nozzle with 2 to 6 rows of nozzles of 5 to 500 nozzles per row.

* * * * *